US008893992B2

United States Patent
Mitchell et al.

(10) Patent No.: US 8,893,992 B2
(45) Date of Patent: Nov. 25, 2014

(54) SYSTEM AND METHOD FOR PULVERIZING A SUBSTANCE

(75) Inventors: Charles Martin Mitchell, Baytown, TX (US); Fredric S. Russ, Humble, TX (US); Chris J. Villa, Houston, TX (US); Steven Craig Russell, Houston, TX (US)

(73) Assignee: General Electric Company, Schenectady, NY (US)

( * ) Notice: Subject to any disclaimer, the term of this patent is extended or adjusted under 35 U.S.C. 154(b) by 153 days.

(21) Appl. No.: 13/450,771

(22) Filed: Apr. 19, 2012

(65) Prior Publication Data

US 2013/0277464 A1  Oct. 24, 2013

(51) Int. Cl.
*B02C 19/18* (2006.01)

(52) U.S. Cl.
USPC .............................................. 241/1; 241/301

(58) Field of Classification Search
CPC .............................. B02C 19/18; B02C 13/286
USPC ....................................................... 241/1, 301
See application file for complete search history.

(56) References Cited

U.S. PATENT DOCUMENTS

| | | | | |
|---|---|---|---|---|
| 2,980,345 A * | 4/1961 | Kececioglu et al. | | 241/1 |
| 3,811,623 A * | 5/1974 | Speer | | 241/1 |
| 4,131,238 A * | 12/1978 | Tarpley, Jr. | | 241/30 |
| 4,313,573 A * | 2/1982 | Goldberger et al. | | 241/1 |
| 4,778,115 A * | 10/1988 | Burnside et al. | | 241/46.06 |
| 5,005,773 A * | 4/1991 | Nyberg et al. | | 241/30 |
| 5,035,363 A * | 7/1991 | Somoza | | 241/1 |
| 5,122,047 A * | 6/1992 | Bauckhage et al. | | 425/174.2 |
| 5,299,746 A * | 4/1994 | Thuenker et al. | | 241/36 |
| 5,577,669 A * | 11/1996 | Vujnovic | | 241/1 |
| 5,586,729 A * | 12/1996 | Davenport | | 241/21 |
| 6,669,122 B2 * | 12/2003 | Kaully et al. | | 241/1 |
| 6,824,086 B1 * | 11/2004 | Mazurkiewicz et al. | | 241/5 |
| 7,040,557 B2 * | 5/2006 | Graham et al. | | 241/1 |
| 7,770,638 B2 * | 8/2010 | Kabishcher et al. | | 166/249 |
| 8,172,163 B2 * | 5/2012 | Soliman Abdalla et al. | | 241/1 |
| 2002/0104652 A1 * | 8/2002 | Cole et al. | | 166/249 |
| 2006/0106307 A1 * | 5/2006 | Dione et al. | | 600/437 |
| 2007/0002678 A1 * | 1/2007 | Murakami | | 366/116 |
| 2010/0072312 A1 * | 3/2010 | Shiina et al. | | 241/46.11 |
| 2011/0226609 A1 * | 9/2011 | Abdalla et al. | | 204/157.42 |

* cited by examiner

*Primary Examiner* — Mark Rosenbaum
*Assistant Examiner* — Onekki Jolly
(74) *Attorney, Agent, or Firm* — Fletcher Yoder, P.C.

(57) ABSTRACT

Embodiments of the present disclosure are directed to a fuel preparation system. The feedstock preparation system includes an acoustic chamber configured to receive a fuel and at least one acoustic wave generator configured to generate acoustic waves to at least partially break up the fuel in the acoustic chamber.

21 Claims, 3 Drawing Sheets

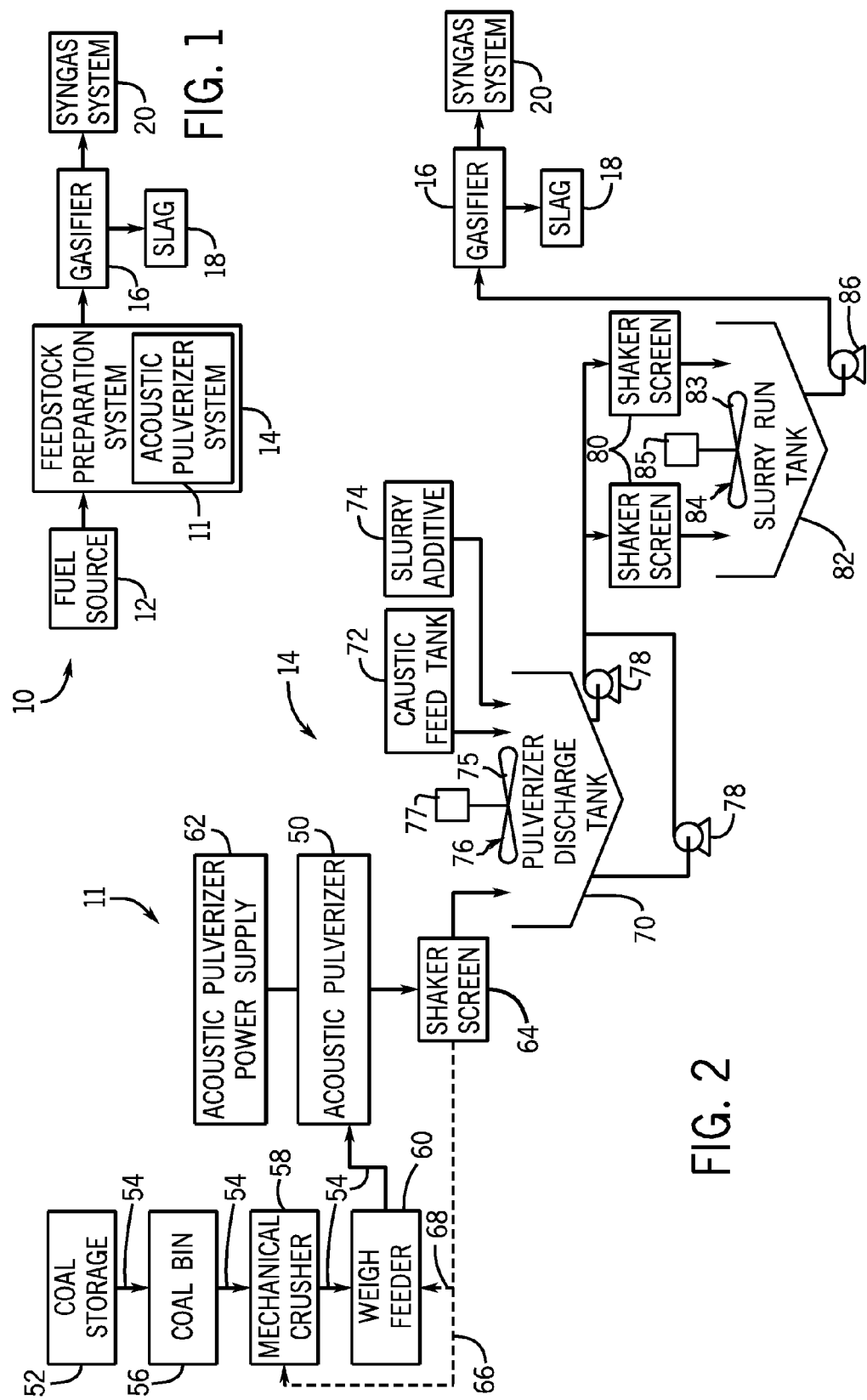

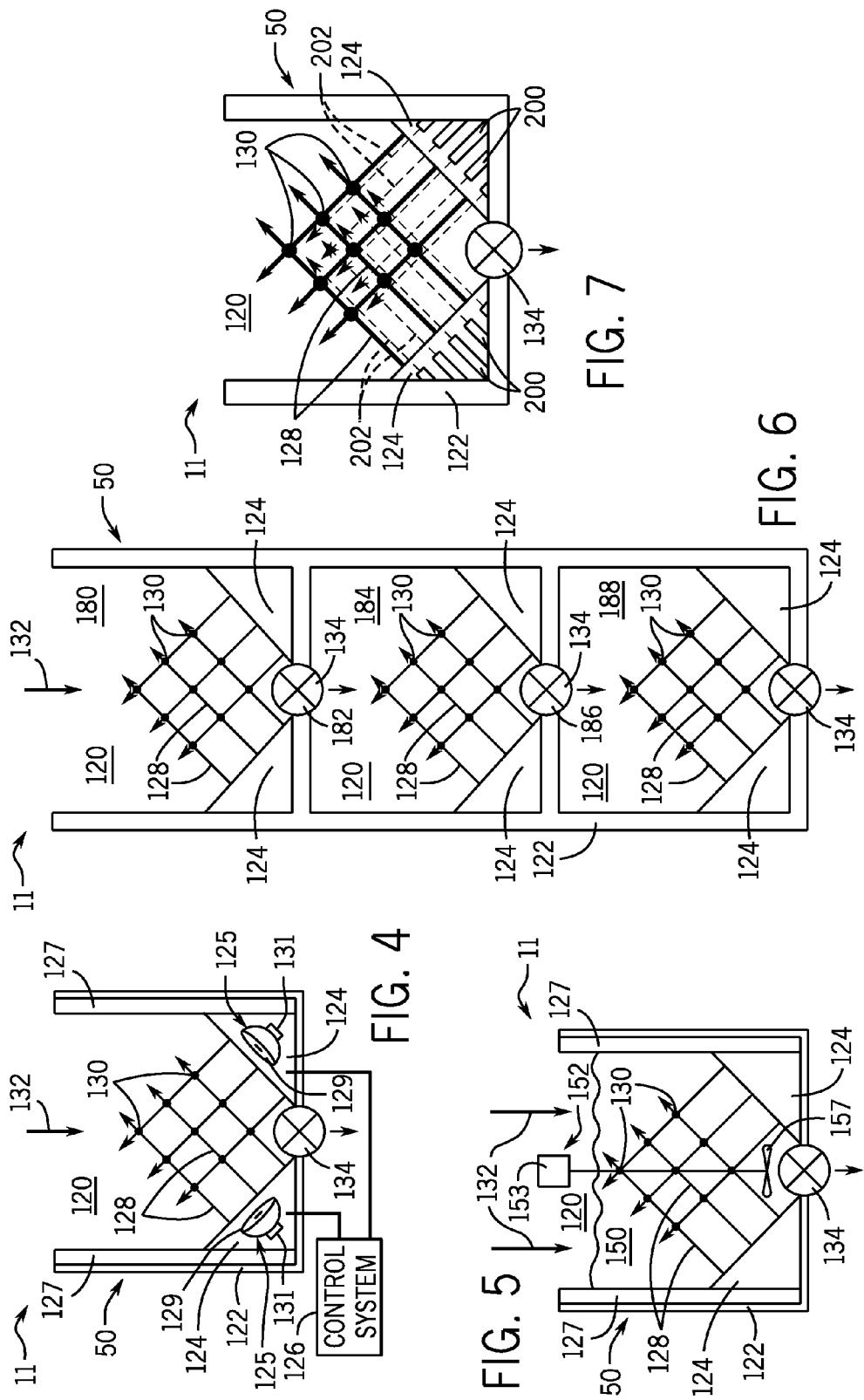

SYSTEM AND METHOD FOR PULVERIZING A SUBSTANCE

BACKGROUND OF THE INVENTION

The subject matter disclosed herein relates to systems and methods for pulverizing a substance, such as a fuel feedstock.

In general, gasification power plants are capable of generating energy from various hydrocarbon feedstock. Specifically, the gasification process converts the hydrocarbon feedstock into a gas mixture of carbon monoxide and hydrogen, i.e., "synthesis gas" (synthetic gas), by reaction with steam or water in a gasifier. These gases may be cleaned, processed, and utilized as fuel in a conventional combined cycle power plant. Generally, a raw fuel source, such as coal, is converted into a useable feedstock prior to gasification. For example, the raw fuel source may be ground and mixed with other additives to form a useable feedstock, such as a slurry. In some applications, the raw fuel grinding process involves rod mill or ball mill operations, which include electrical motors, mechanical gear boxes, metal rods, and other heavy machinery. Unfortunately, the use of such machinery may lead to metal contamination of the feedstock. Additionally, the mill machinery may require large amounts of power, robust foundations systems, independent lubrication systems, and/or significant routine maintenance.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a fuel preparation system having an acoustic chamber configured to receive a fuel and at least one acoustic wave generator configured to generate acoustic waves to at least partially break up the fuel in the acoustic chamber.

In a second embodiment, a system includes a fuel preparation system having at least one acoustic chamber, a first acoustic wave generator configured to generate first acoustic waves, and a second acoustic wave generator configured to generate second acoustic waves, wherein the first and second acoustic waves are configured to at least partially break up a fuel.

In a third embodiment, a method includes exposing a fuel to acoustic waves within an acoustic chamber, wherein the acoustic waves are generated by at least one acoustic wave generator, and wherein the acoustic waves are configured to at least partially break up the fuel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 is a schematic of an embodiment of a gasification system including a feedstock preparation system having an acoustic pulverizer system;

FIG. 2 is a schematic of an embodiment of a feedstock preparation system having the acoustic pulverizer system, of FIG. 1;

FIG. 4 is a schematic of an embodiment of an acoustic pulverizer system;

FIG. 5 is a schematic of an embodiment of an acoustic pulverizer system;

FIG. 6 is a schematic of an embodiment of an acoustic pulverizer system; and

FIG. 7 is a schematic of an embodiment of an acoustic pulverizer system.

DETAILED DESCRIPTION OF THE INVENTION

Figure 3:
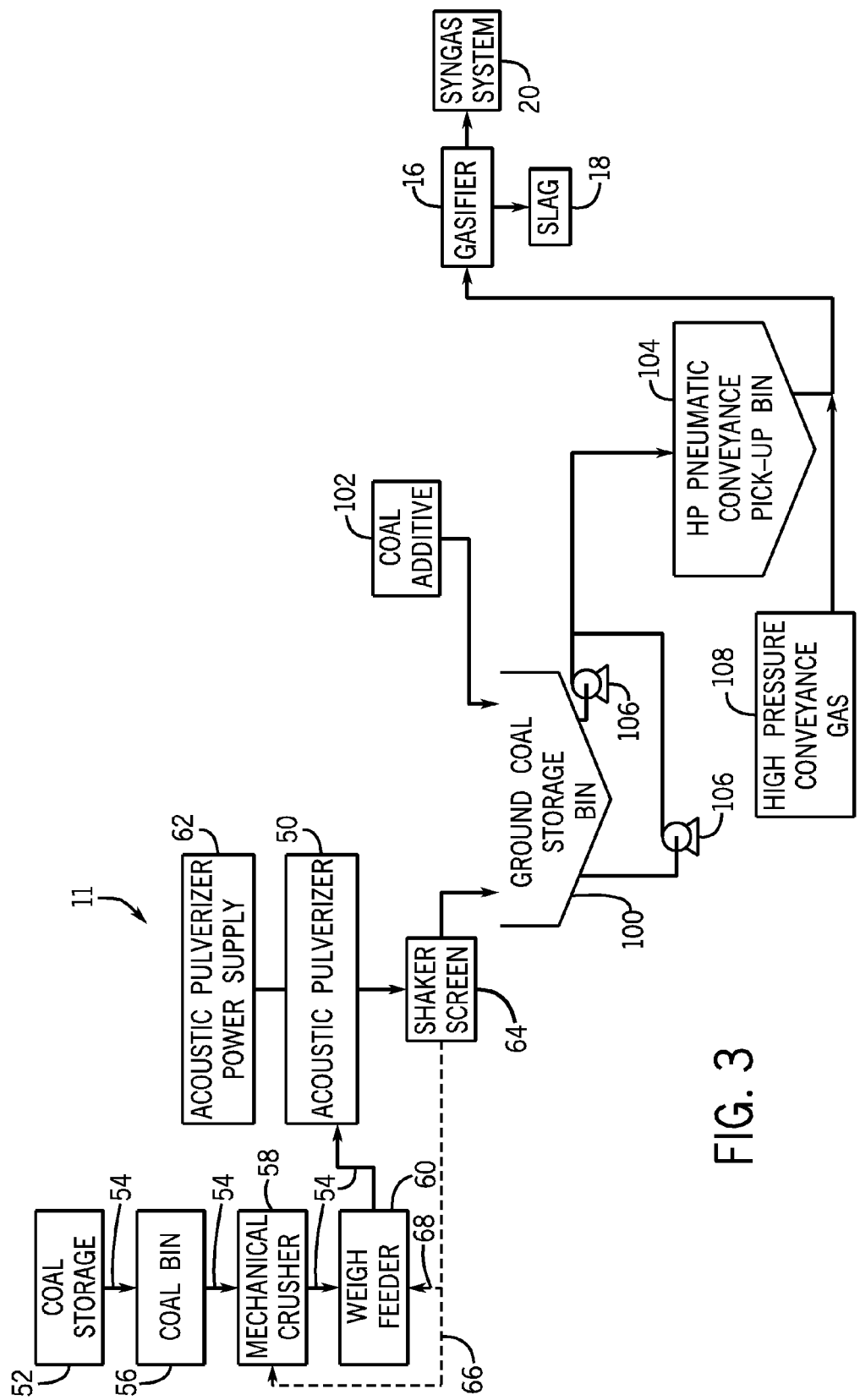
FIG. 3 is a schematic of an embodiment of a feedstock preparation system having the acoustic pulverizer system, of FIG. 1.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed toward an acoustic pulverizer system, which may be used with a feedstock preparation system. Specifically, the acoustic pulverizer system is configured to pulverize or fragment a substance, such as a solid fuel, a liquid fuel, and/or a slurry fuel, to prepare a feedstock. Example fuel sources include carbonaceous substances, such as coal or biofuels. For example, the acoustic pulverizer system may be configured to prepare a dry feedstock (e.g., a dry solid fuel) or a wet feedstock (e.g., a fuel slurry). More specifically, the acoustic pulverizer system includes sonic pulse generators or acoustic wave generators, which generate sonic pulses or acoustic waves that collide with the fuel source and fragment or pulverize the fuel source. As will be appreciated, the acoustic pulverizer system may use a substantially lesser amount of power and maintenance than used by traditional mechanical grinders (e.g., rod mills) to fragment a fuel source. Additionally, the described embodiments may be utilized in a variety of applications such as furnace operations or gasification. Therefore, while the embodiments discussed below are described in the context of a gasification application, the disclosed embodiments are not intended to be limited to gasification. Accordingly, the disclosed acoustic pulverizer systems may be used to fragment, pulverize, break up, mix, and/or generally convert any substance into a more uniform mixture of fine particles, which may then be used as a feedstock for a reactor, a combustor, a boiler, a gasifier, or any other equipment.

FIG. 1 is a schematic of a system 10, such as an integrated gasification combined cycle (IGCC) system, that may be powered by synthesis gas. As discussed in detail below, the system 10 includes an acoustic pulverizer system 11 configured to pulverize a fuel source 12, such as a solid feed, which may be utilized as a source of energy for the system 10. The fuel source 12 may include coal, petroleum coke, biomass, wood-based materials, agricultural wastes, tars, coke oven gas and asphalt, or other carbon containing items.

The fuel source 12 (e.g., solid fuel) may be passed to a feedstock preparation system 14. The feedstock preparation system 14 may, for example, resize or reshape the fuel source 12 by chopping, milling, shredding, pulverizing, briquetting, or palletizing the fuel source 12 to generate feedstock, such as a slurry. As discussed in detail below, in certain embodiments, the feedstock preparation system 14 includes the acoustic pulverizer system 11 to help generate a feedstock from the fuel source 12. Additionally, water, or other suitable liquids, may be added to the fuel source 12 in the feedstock preparation system 14 to create slurry feedstock. In other embodiments, no liquid is added to the fuel source 12, thus yielding dry feedstock.

The feedstock is passed to a gasifier 16 from the feedstock preparation system 14. In other embodiments, the feedstock may be used in a combustor, a reactor, a furnace, a boiler, or an engine. The gasifier 16 may convert the feedstock into synthesis gas, e.g., a combination of carbon monoxide and hydrogen. This conversion may be accomplished by subjecting the feedstock to a controlled amount of steam and oxygen at elevated pressures (e.g., from approximately 400 psia-1300 psia) and temperatures (e.g., approximately 2200° F.-2700° F.), depending on the type of gasifier 16 utilized. The heating of the feedstock during a pyrolysis process may generate a solid (e.g., char) and residue gases (e.g., carbon monoxide, hydrogen, and nitrogen). The char remaining from the feedstock from the pyrolysis process may only weigh up to approximately 30% of the weight of the original feedstock.

The combustion reaction in the gasifier 16 may include introducing oxygen to the char and residue gases. The char and residue gases may react with the oxygen to form carbon dioxide and carbon monoxide, which provides heat for the subsequent gasification reactions. The temperatures during the combustion process may range from approximately 2200° F. to approximately 2700° F. In addition, steam and/or water may be introduced into the gasifier 16. The gasifier utilizes steam and/or water and oxygen to allow some of the feedstock to be burned to produce carbon monoxide and energy and drive a second reaction that converts further feedstock to hydrogen and additional carbon dioxide.

In this way, a resultant gas may be manufactured by the gasifier 16. For example, the resultant gas (synthesis gas) may include approximately 85% of carbon monoxide and hydrogen, as well as $CH_4$, $HCl$, $HF$, $COS$, $NH_3$, $HCN$, and $H_2S$ (based on the sulfur content of the feedstock). However, the synthesis gas composition may vary within wide ranges, depending on the feedstock used and/or the specific gasification application. The gasifier 16 may also generate waste, such as slag 18, which may be a wet ash material. The synthesis gas generated is then used as a fuel in a synthesis gas system 20. For example, the synthesis gas system 20 may include a gas turbine engine, which combusts the synthesis gas in a combustor, a gas turbine driven generator, a chemical production system, and so forth.

FIG. 2 is a schematic of an embodiment of the feedstock preparation system 14, which includes the acoustic pulverizer system 11 having an acoustic pulverizer 50. As discussed in detail below, the acoustic pulverizer system 11 (e.g., acoustic pulverizer 50) is configured to use acoustic waves to fragment or pulverize the fuel source 12 for the preparation of a feedstock for gasification or furnace operations. As discussed below, the acoustic pulverizer system 11 (e.g., acoustic pulverizer 50) may be configured for use in different feedstock preparation systems 14. For example, in the illustrated embodiment, the feedstock preparation system 14 having the acoustic pulverizer system 11 (e.g., acoustic pulverizer 50) is configured to produce a wet feedstock (e.g., a slurry). Other embodiments of the feedstock preparation system 14 having the acoustic pulverizer system 50 may be configured to produce a dry feedstock. While the illustrated embodiment describes the fuel source 12 as including coal, it is important to note that the fuel source 12 may be any fuel. For example, the fuel source 12 may be a solid fuel without a liquid (e.g., a dry feedstock), a solid fuel within a carrier medium (e.g., a liquid carrier medium), or any combination thereof.

In the illustrated embodiment, the fuel source 12 includes a coal storage 52 which supplies coal 54 to a coal bin 56. The coal 54 is then transferred from the coal bin 56 to a mechanical crusher 58. As will be appreciated, the mechanical crusher 58 is configured to preliminarily break up or crush the coal into smaller portions. For example, the mechanical crusher 58 may include presses, rods, gears, or other mechanical components to break up the coal 54 into smaller portions. Thereafter, the coal 54 is transferred to a weigh feeder 60. The weigh feeder 60 is configured to supply the coal 54 to the acoustic pulverizer system 11 (e.g., acoustic pulverizer 50) at a desired rate. More specifically, the amount (e.g., weight) of coal 54 used for different applications (e.g., gasifiers, furnaces, etc.) may vary. As a result, the weigh feeder 60 is used to ensure that the proper amount (e.g., weight) of coal 54 is processed through the feedstock preparation system 14 at the desired rate. For example, the weigh feeder 60 may include a conveyor belt with a variable speed that is adjusted based on the weight of the coal 54 supplied by the mechanical crusher 58 and/or the amount of coal 54 needed to prepare the desired feedstock.

As shown, the weigh feeder 60 supplies the coal 54 to the acoustic pulverizer system 11 (e.g., acoustic pulverizer 50). As discussed in detail below, the acoustic pulverizer system 11 (e.g., acoustic pulverizer 50) further crushes, pulverizes, or fragments the coal 54 for feedstock preparation using acoustic waves or sonic pulses generated from power supplied by an acoustic pulverizer power supply 62. For example, the acoustic pulverizer 50 may include one or more acoustic chambers (e.g., 1, 2, 3, 4, 5, or more) to direct acoustic waves on the coal 54 to pulverize the coal 54. Additionally, as mentioned above, the feedstock preparation system 14 having the acoustic pulverizer system 11 may be configured to produce a dry feedstock or a wet feedstock (e.g., a slurry). As a result, the components of the acoustic pulverizer system 11 may vary depending on the type of feedstock produced by the feedstock preparation system 14. For example, as mentioned above, the illustrated embodiment of the feedstock preparation system 14 is configured to produce a slurry. Therefore, the acoustic pulverizer system 11 may include liquid components, such as liquid fluidization jets or one or more liquid-filled tanks, to mix a fluid (e.g., water) with the coal 54.

Once the coal 54 is processed by the acoustic pulverizer system 11, the coal or slurry generated by the acoustic pulverizer system 11 is passed through a shaker screen 64. The shaker screen 64 may be a mesh panel or other sieve configured to allow finer coal to pass through while blocking or retaining larger portions of coal that may have passed through the acoustic pulverizer system 11 without being sufficiently fragmented or pulverized. The larger portions of coal retained by the shaker screen 64 may then be directed upstream to be reworked in the feedstock preparation system 14. For example, the larger portions of coal may be routed to the mechanical crusher 58, as indicated by line 66, or to the weigh feeder 60, as indicated by line 68.

As shown, the coal 54 that passes through the shaker screen 64 is deposited into a pulverizer discharge tank 70, which may contain water. Within the pulverizer discharge tank 70, the coal is combined and mixed with the water and other components to form a slurry. For example, a caustic feed tank 72 supplies a caustic ingredient to the pulverizer discharge tank 70. As will be appreciated, the caustic ingredient may be added to the pulverizer discharge tank 70 to help control or regulate the pH level of the feedstock prepared by the feedstock preparation system 14. Additionally, a slurry additive 74 may be added to the mixture within the pulverizer discharge tank 70. For example, the slurry additive 74 may be a dispersant configured to evenly disperse the pulverized coal 54 within the water to produce a liquid slurry and reduce the possibility of clumping or hardening of the slurry. As shown, the pulverizer discharge tank 70 includes an agitator or mixer 76 (e.g., rotary blades 75 driven by a motor 77), which operates to mix the components combined within the pulverizer discharge tank 70.

Once the components in the pulverizer discharge tank 70 are combined and mixed, pulverizer discharge pumps 78 are used to route the slurry through shaker screens 80 and into a slurry run tank 82. As similarly described above, the shaker screens 80 are configured to block or retain hardened or clumped portions of the slurry. Once the slurry enters the slurry run tank 82, a mixer 84 (e.g., rotary blades 83 driven by a motor 85) further agitates the slurry to ensure that the slurry evenly and thoroughly mixed. From the slurry run tank 82, the slurry is routed to the gasifier 16 for gasification by a slurry charge pump 86.

FIG. 3 is a schematic of an embodiment of the feedstock preparation system 14, which includes the acoustic pulverizer system 11. In the illustrated embodiment, the feedstock preparation system 14 is configured to produce a dry feedstock. As a result, the acoustic pulverizer system 11 may not include liquid components. The illustrated embodiment includes several similar elements and element numbers as the embodiment illustrated in FIG. 2. While the illustrated embodiment describes the fuel source 12 as including coal, it is important to note that the fuel source 12 may be any solid fuel.

In the manner described above, the coal 54 is supplied to the acoustic pulverizer system 11 (e.g., acoustic pulverizer 50). Once the coal 54 is fragmented and pulverized within the acoustic pulverizer system 11 (e.g., acoustic pulverizer 50), the coal 54 is routed through the shaker screen 64 and into a ground coal storage bin 100. In the ground coal storage bin 100, the coal 54 is combined with a coal additive 102. For example, the coal additive 102 may be configured to increase the reactivity of the coal 54 during gasification. The coal additive 102 may also be configured to improve the quality of the byproducts produced during gasification. Once the coal 54 and the coal additive 102 are combined in the ground coal storage bin 100, the resulting mixture (e.g., dry feedstock) is transferred to a high pressure pneumatic conveyance pick-up bin 104 by high pressure solids pumps 106. Thereafter, the dry feedstock exits the high pressure pneumatic conveyance pick-up bin 104 and is routed to the gasifier 16 by a high pressure conveyance gas 108, such as nitrogen.

FIG. 4 is a schematic of an embodiment of the acoustic pulverizer system 11, which may be used in the feedstock preparation system 14 configured to prepare a dry feedstock or a wet feedstock (e.g., a slurry). In the illustrated embodiment, the acoustic pulverizer 50 includes a single acoustic chamber 120 defined by an exterior wall 122, which may be a metal, such as steel. Additionally, the acoustic pulverizer 50 includes two sonic pulse generators 124 (e.g., acoustic wave generators). For example, the sonic pulse generators 124 may be electrically-controlled loudspeakers 125. As shown each loudspeaker 125 includes a magnet 131 and a cone 129. In other embodiments, the sonic pulse generators 124 may include horns, pulse detonation devices, or other acoustic wave generators. The operation of the sonic pulse generators 124 is controlled by a control system 126. As will be appreciated, the sonic pulse generators 124 may produce sonic pulses or acoustic waves having various frequencies, amplitudes, and so forth. The control system 126 is configured regulate the operation of the sonic pulse generators 124, such that the sonic pulses produced by the sonic pulse generators 124 adequately pulverize the coal 54 routed into the acoustic pulverizer system 50. Additionally, the control system 126 may be configured to control the sonic pulse generators 124 based on feedback such as fuel type, output flow rate, gasifier feedback, and so forth. In the illustrated embodiment, the acoustic chamber 120 further includes a rubber coating 127 or other coating material disposed on an interior of the acoustic chamber 120 (e.g., on an interior side of the exterior wall 122). As will be appreciated, the rubber coating 127 may operate to protect the exterior walls 122 and reduce noise pollution generated by the sonic pulse generators 124.

As shown, the sonic pulse generators 124 are positioned at the bottom of the acoustic chamber 120. Moreover, the sonic pulse generators 124 are positioned such that sonic pulses 128 generated by one sonic pulse generator 124 will cross paths (e.g., crosswise to one another) with the sonic pulses 128 of the other sonic pulse generator 124. In this manner, high pressure zones or "nodes" 130 will exist at the points where the sonic pulses 128 intersect. When the coal 54 is deposited into the acoustic chamber 120, as indicated by arrow 132, the coal 54 passes through the nodes 130, and the high pressure of the nodes 130 may cause the coal 54 to fragment or pulverize, thereby dividing or breaking portions of coal 54 into smaller portions (e.g., finer particles) of coal 54. For example, the acoustic pulverizer 50 may break down the coal 54, e.g., reduce the volume of each coal 54 portion, to a new size or volume of approximately 1 to 90, 2 to 80, 3 to 70, 4 to 60, 5 to 50, 6 to 40, 7 to 30, 8 to 20, or 9 to 10 percent of its original size. As the coal 54 fragments and is pulverized by the nodes 130 and the sonic pulses 128, the pulverized coal may subsequently pass through a rotary valve 134 at the bottom of the acoustic chamber 120. As will be appreciated, the rotary valve 134 is configured to allow sufficiently pulverized or fragmented coal 54 to pass through the rotary valve, and thereby exit the acoustic chamber 120, while blocking large portions of coal 54 that have yet to be pulverized from exiting the acoustic chamber 120. Once the pulverized coal 54 exits the acoustic chamber 120 through the rotary valve 134, the pulverized coal 54 is routed to the shaker screen 64 shown in FIGS. 2 and 3.

FIG. 5 is a schematic of an embodiment of the acoustic pulverizer system 11 (e.g., acoustic pulverizer 50) configured for use in a feedstock preparation system 14 that produces a wet feedstock (e.g., a slurry). More specifically, the acoustic chamber 120 of the acoustic pulverizer system 50 contains a liquid 150, such as water. For example, the liquid 150 may be used to saturate the fuel source 12 before the fuel source 12 is combined with slurry materials or components downstream. The illustrated embodiment includes similar elements and element numbers as the embodiment illustrated in FIG. 4.

As will be appreciated, the sonic pulses 128 may be transmitted more effectively through the liquid 150 than through an air medium. In this manner, the coal 54 passing through the acoustic pulverizer 50 may be pulverized or fragmented more quickly and effectively, thereby increasing the rate at which the coal 54 is pulverized. Additionally, the inclusion of the liquid 150 in the acoustic pulverizer 50 helps produce the wet feedstock (e.g., slurry) from the coal 54. The illustrated embodiment of the acoustic pulverizer system 11 further includes an agitator 152 (e.g., rotary blades 151 driven by a motor 153), which mixes and distributes the coal 54 more uniformly throughout to more effectively expose the coal 54 to the sonic pulses 128 within the acoustic chamber 120. In this manner, the probability of the coal 54 interacting with the nodes 130 (i.e., high pressure zones) is increased, thereby further increasing the efficiency of the pulverizing process. The pulverized coal 54 combines with the liquid 150 to form a slurry or saturated wet feedstock, which passes through the rotary valve 134 and then flows to the shaker screen 64.

FIG. 6 is a schematic of an embodiment of the acoustic pulverizer system 11 (e.g., acoustic pulverizer 50), illustrating three acoustic chambers 120 arranged in a series configuration (e.g., a vertical stack configuration). The illustrated embodiment includes similar elements and element numbers as the embodiment shown in FIG. 4. For example, each of the three acoustic chambers 120 includes sonic pulse generators 124 configured to generate sonic pulses 128. Furthermore, the sonic pulse generators 124 within each acoustic chamber 120 are arranged such that the sonic pulses 128 generated by each sonic pulse generator 124 intersect one another to form the nodes 130 (i.e., high pressure zones) where the coal 54 may be pulverized and fragmented.

As shown, the coal 54 enters the acoustic chamber 120 at the top of the vertical stack (e.g., a first acoustic chamber 180) and is at least partially pulverized by the sonic pulses 128 generated by the sonic pulse generators 124 within the first acoustic chamber 120, 180. Thereafter, the coal 54 passes through a first rotary valve 134, 182 and enters the acoustic chamber 120 in the middle of the vertical stack (e.g., a second acoustic chamber 184). Within the second acoustic chamber 184, the coal 54 is further pulverized by the sonic pulses 128 generated by the sonic pulse generators 124 within the second acoustic chamber 120, 184. In this manner, portions of coal 54 that may not have been thoroughly pulverized in the first acoustic chamber 180 may be further pulverized. Subsequently, the coal 54 passes through a second rotary valve 134, 186 and enters the acoustic chamber 120 at the bottom of the vertical stack (e.g., a third acoustic chamber 188). Within the third acoustic chamber 188, the coal 54 is even further pulverized by the sonic pulses 128 produced by the sonic pulse generators 124 inside the third acoustic chamber 120, 188. Thereafter, the pulverized coal 54 exits the acoustic pulverizer system 50 through a third rotary valve 134, 190 and is routed to the shaker screen 64.

In certain embodiments, the acoustic pulverizer system 11 may be gravity fed and first, second, and third rotary valves 182, 186, and 190 maybe be configured to pass successively smaller portions of coal 54. In other words, the first rotary valve 182 may be configured to pass units of coal 54 of a first particle size, the second rotary valve 186 may be configured to pass units of coal 54 of a second particle size, and the third rotary valve 190 may be configured to pass units of coal 54 of a third particle size, where the second particle size is smaller than the first particle size, and the third particle size is smaller than the second particle size. In this manner, the coal 54 may be pulverized to the first particle size in the first acoustic chamber 180. Subsequently, the coal 54 may be further pulverized to the second particle size (e.g., smaller than the first particle size) in the second acoustic chamber 184, and the coal 54 may be even further pulverized to the third particle size (e.g., smaller than the second particle size) in the third acoustic chamber 188. In such an embodiment, the respective sonic pulse generators 124 of the first, second, and third acoustic chambers 180, 184, and 188 may be mounted at different positions, angles, etc., within their respective acoustic chambers 120. Furthermore, the respective sonic pulse generators 124 of the first, second, and third acoustic chambers 180, 184, and 188 may operate at different amplitudes, frequencies, wave patterns, and so forth.

As will be appreciated, the acoustic pulverizer system 50 having multiple acoustic chambers 120 arranged in a series configuration (e.g., a vertical stack configuration) may be used in a variety of feedstock preparation system 14 applications. In other words, the illustrated embodiment of the acoustic pulverizer system 11 may be used in preparing a wet feedstock (e.g., a slurry) or a dry feedstock. For example, one or more of the acoustic chambers 120 in the illustrated acoustic pulverizer system 50 may contain the liquid 150 to mix with the coal 54 for preparing a wet feedstock (e.g., a slurry). Additionally, certain embodiments of the feedstock preparation system 14 may include multiple acoustic pulverizer systems 50, each acoustic pulverizer system 60 having multiple acoustic chambers 120 arranged in a series configuration (e.g., a vertical stack configuration).

FIG. 7 is a schematic of an embodiment of the acoustic pulverizer system 11 (e.g., acoustic pulverizer 50), illustrating the acoustic chamber 120 having fluidization jets 200 in addition to the sonic pulse generators 124. The illustrated embodiment includes similar elements and element numbers as the embodiment shown in FIG. 4. As shown, the fluidization jets 200 are disposed near the bottom of the acoustic chamber 120, and the fluidization jets 200 are pointed in a generally upward direction. The fluidization jets 200 are configured to inject a fluidization medium 202 into the acoustic chamber 120. The injection of the fluidization medium 202 may cause the coal 54 within the acoustic chamber 120 to be lifted and stirred within the acoustic chamber 120. In this manner, the coal 54 may be agitated and transferred to the nodes 130 (i.e., high pressure zones) created by the intersecting sonic pulses 128. The fluidization medium 202 may be a gas, such as high pressure nitrogen or carbon dioxide, or a liquid, such as high pressure water. As will be appreciated, for embodiments of the feedstock preparation system 14 that generate a wet feedstock (e.g., a slurry), the fluidization jets 200 of the acoustic chamber 120 may inject a liquid fluidization medium 202 and/or a gaseous fluidization medium 202. For embodiments of the feedstock preparation system 14 that generate a dry feedstock, the fluidization jets 200 of the acoustic chamber 200 may inject a gaseous fluidization medium 202.

Embodiments of the present disclosure are directed toward the acoustic pulverizer system 11 (e.g., acoustic pulverizer 50), which may be used with the feedstock preparation system 14. The acoustic pulverizer system 11 (e.g., acoustic p pulverizer 50) is configured to pulverize or fragment a fuel source 12, such as coal 54, to prepare a feedstock for gasification, furnace operations, etc. For example, the acoustic pulverizer system 11 (e.g., acoustic pulverizer 50) may be configured to prepare a dry feedstock or a wet feedstock (e.g., a slurry). More specifically, the acoustic pulverizer system 11 (e.g., acoustic pulverize 50) includes sonic pulse generators 124, which generate sonic pulses 128 that collide with the fuel source 12 and fragment or pulverize the fuel source 12. For example, the sonic pulse generators 124 may be loudspeakers, subwoofers, horns, pulse detonation devices, and so forth. As will be appreciated, the acoustic pulverizer system 11 (e.g., acoustic pulverizer 50) may use a substantially lesser amount of power with lesser maintenance than traditional mechanical grinders (e.g., rod mills).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gasifier feedstock preparation system, comprising:
      an acoustic chamber comprising an inlet configured to receive a gasifier feedstock and an outlet configured to output the gasifier feedstock; and
      at least one acoustic wave generator configured to generate acoustic waves to at least partially break up the gasifier feedstock in the acoustic chamber, wherein the at least one acoustic wave generator is disposed between the inlet and the outlet; and
   a gasifier configured to gasify the gasifier feedstock.

2. The system of claim 1, wherein the gasifier feedstock preparation system comprises at least two generators configured to generate first and second acoustic waves that interact with one another within the acoustic chamber, wherein the first and second acoustic waves are oriented cross-wise at an angle relative to one another.

3. The system of claim 1, wherein the acoustic chamber is configured to contain a liquid to facilitate transmission of the acoustic waves to the gasifier feedstock.

4. The system of claim 3, comprising an agitator configured to mix the liquid and the gasifier feedstock within the acoustic chamber.

5. The system of claim 1, wherein the gasifier feedstock preparation system comprises at least one fluidization jet configured to inject a fluid into the acoustic chamber to agitate the gasifier feedstock.

6. The system of claim 5, wherein the at least one fluidization jet comprises a liquid jet.

7. The system of claim 5, wherein the at least one fluidization jet comprises a gas jet.

8. The system claim 1, wherein the gasifier feedstock preparation system comprises at least two acoustic chambers, and each acoustic chamber comprises at least one acoustic wave generator configured to generate acoustic waves to at least partially break up the gasifier feedstock in each acoustic chamber.

9. The system of claim 8, wherein the at least two acoustic chambers are arranged in a series configuration, to apply acoustic waves to the gasifier feedstock in a plurality of stages.

10. The system of claim 1, wherein the gasifier feedstock preparation system is a solid feedstock preparation system, and the gasifier feedstock comprises a solid feedstock.

11. The system of claim 1, comprising a flow path extending between the outlet and the gasifier, wherein the flow path is configured to enable flow of the gasifier feedstock from the gasifier feedstock preparation system to the gasifier.

12. A system, comprising:
   a fuel preparation system, comprising:
      at least one acoustic chamber;
      a first acoustic wave generator configured to generate first acoustic waves;
      a second acoustic wave generator configured to generate second acoustic waves, wherein the first and second acoustic waves are configured to at least partially break up a fuel, and the first and second acoustic waves are oriented cross-wise at an angle relative to one another; and
      a controller configured to control an operating parameter of the first and second acoustic wave generators based on feedback received from the fuel preparation system or a system configured to use the fuel from the fuel preparation system.

13. The system of claim 12, wherein the first and second acoustic wave generators each comprise a subwoofer, a loudspeaker, a horn, a pulse detonation device, or a combination thereof.

14. The system of claim 12, wherein the first and second acoustic wave generators are configured such that the first and second acoustic waves intersect one another within the at least one acoustic chamber.

15. The system of claim 12, wherein the at least one acoustic chamber is configured to contain a liquid to facilitate transmission of the first and second acoustic waves to the fuel.

16. The system of claim 12, wherein an interior wall of the acoustic chamber is at least partially lined with a rubber coating.

17. The system of claim 12, wherein the fuel preparation system comprises at least one fluidization jet configured to inject a fluid into the at least one acoustic chamber to agitate the fuel, wherein the fluidization jet comprises a liquid jet or a gas jet.

18. A method, comprising:
   exposing a fuel to first and second acoustic waves within an acoustic chamber, wherein the first acoustic waves are generated by a first acoustic wave generator, the second acoustic waves are generated by a second acoustic wave generator, and the first and second acoustic waves are oriented cross-wise at an angle relative to one another, and the first and second acoustic waves are configured to at least partially break up the fuel.

19. The method of claim 18, comprising facilitating transmission of the first and second acoustic waves to the fuel with a liquid disposed within the acoustic chamber.

20. The method of claim 18, comprising agitating the fuel with a fluid or a gas injected into the acoustic chamber by at least one fluidization jet.

21. The system of claim 12, wherein the feedback comprises a type of the fuel, an output flow rate of the fuel, a gasifier feedback, or any combination thereof.

* * * * *